United States Patent
Lee et al.

(10) Patent No.: US 8,765,299 B2
(45) Date of Patent: Jul. 1, 2014

(54) ELECTRODE ASSEMBLY AND SECONDARY BATTERY INCLUDING THE SAME

(75) Inventors: Jonghwa Lee, Yongin-si (KR); Seongil Lee, Yongin-si (KR); Sangheon Lee, Yongin-si (KR); Ikkyu Kim, Yongin-si (KR); Chohee Kang, Yongin-si (KR); Youngchang Kim, Yongin-si (KR); Eunyoung Jung, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 6 days.

(21) Appl. No.: 12/952,086

(22) Filed: Nov. 22, 2010

(65) Prior Publication Data

US 2011/0177389 A1    Jul. 21, 2011

Related U.S. Application Data

(60) Provisional application No. 61/295,543, filed on Jan. 15, 2010.

(51) Int. Cl.
*H01M 4/02* (2006.01)

(52) U.S. Cl.
USPC ....................................... 429/211

(58) Field of Classification Search
CPC ... Y02E 60/112; Y02E 60/122; Y02E 60/126; Y02E 60/13
USPC ................... 429/211, 235, 243, 246
See application file for complete search history.

(56) References Cited

U.S. PATENT DOCUMENTS

| | | | |
|---|---|---|---|
| 2003/0224242 A1* | 12/2003 | Kaito et al. | 429/94 |
| 2004/0151987 A1* | 8/2004 | Kawase et al. | 429/338 |
| 2006/0035153 A1* | 2/2006 | Muraoka et al. | 429/246 |
| 2006/0257726 A1* | 11/2006 | Kelley et al. | 429/142 |
| 2008/0241689 A1* | 10/2008 | Takami et al. | 429/220 |

FOREIGN PATENT DOCUMENTS

| | | |
|---|---|---|
| CN | 1503994 | 6/2004 |
| CN | 1720635 | 1/2006 |
| CN | 10188284 | 5/2008 |
| KR | 10-2008-0003473 | 1/2008 |
| KR | 10-2008-0038465 | 5/2008 |
| KR | 10-2008-0039035 | 5/2008 |

\* cited by examiner

*Primary Examiner* — Patrick Ryan
*Assistant Examiner* — Alex Usyatinsky
(74) *Attorney, Agent, or Firm* — Knobbe Martens Olson & Bear LLP (57) ABSTRACT

An electrode assembly and a secondary battery including the electrode assembly are disclosed. The electrode assembly includes a first electrode, a second electrode, and a separator disposed between the first and second electrodes. A film is disposed on at least one edge of at least one of the first and second electrodes.

18 Claims, 10 Drawing Sheets

FIG. 11

ELECTRODE ASSEMBLY AND SECONDARY BATTERY INCLUDING THE SAME

CROSS-REFERENCE TO RELATED APPLICATIONS

This application claims priority to and the benefit of U.S. Provisional Application No. 61/295,543, filed on Jan. 15, 2010, the entire content of which is incorporated herein by reference.

BACKGROUND

1. Field

The present technology relates to an electrode assembly and a secondary battery including the electrode assembly.

2. Description of the Related Technology

Use of portable electronic devices has been increased with the rapid development of electronic, communication, and computer industries. Rechargeable secondary batteries are widely used as power sources of portable electronic devices.

A secondary battery typically includes a positive electrode, a negative electrode, and a separator disposed between the positive electrode and the negative electrode as an insulator.

The positive electrode and the negative electrode are typically insulated from each other. In addition, the positive electrode and the negative electrode are typically insulated from other parts of the secondary battery for preventing unnecessary electric contacts.

However, since the positive electrode or the negative electrode expands and contracts while the secondary battery is charged and discharged, the positive electrode or the negative electrode may develop a short circuit.

SUMMARY

Embodiments are directed to an electrode assembly in which a short circuit caused by expansion and contraction of a positive or negative electrode during charging and discharging is avoided, and a secondary battery including the electrode assembly.

Embodiment of the present invention include an electrode assembly and a secondary battery including the electrode assembly. The electrode assembly includes a first electrode, a second electrode, and a separator disposed between the first and second electrodes, wherein a film is disposed on at least one edge of at least one of the first and second electrodes.

The at least one of the first and second electrodes may be a negative electrode.

The at least one of the first and second electrodes may include a coating portion on at least one side, and the coating portion may comprise silicon or a silicon-containing compound.

The film may comprise an insulating material.

The film may comprise a base layer and an adhesive layer, wherein the base layer is adhered to the at least one electrode by the adhesive layer.

The film may be disposed on one edge of the at least one of the first and second electrodes and an electrode tab may extend from a parallel edge of the other electrode of the first and second electrodes.

According to the embodiments of the present invention, various effects can be accomplished. For example, according to the electrode assembly and the secondary battery including the electrode assembly of the embodiments of the present invention, although the electrode assembly expands and contracts during charging/discharging, a short circuit between the positive or negative electrode with another part of the electrode assembly can be prevented.

DETAILED DESCRIPTION

Example embodiments will now be described more fully hereinafter with reference to the accompanying drawings.

Figure 1:
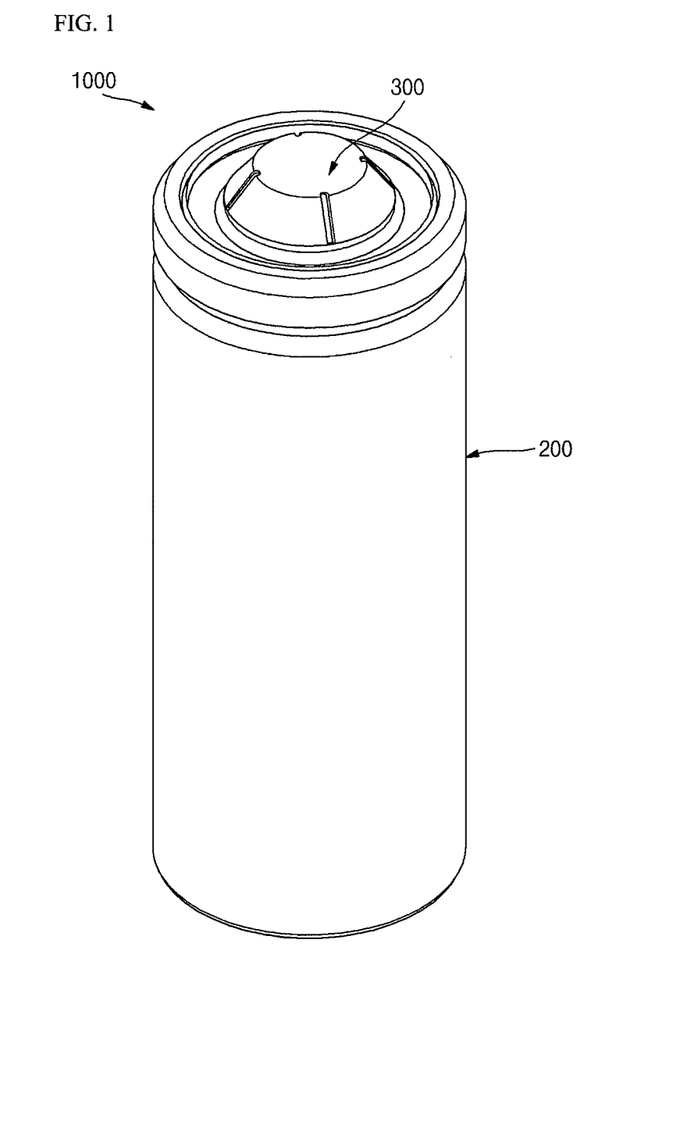
FIG. 1 is a perspective view illustrating a secondary battery according to an embodiment.
Figure 2:
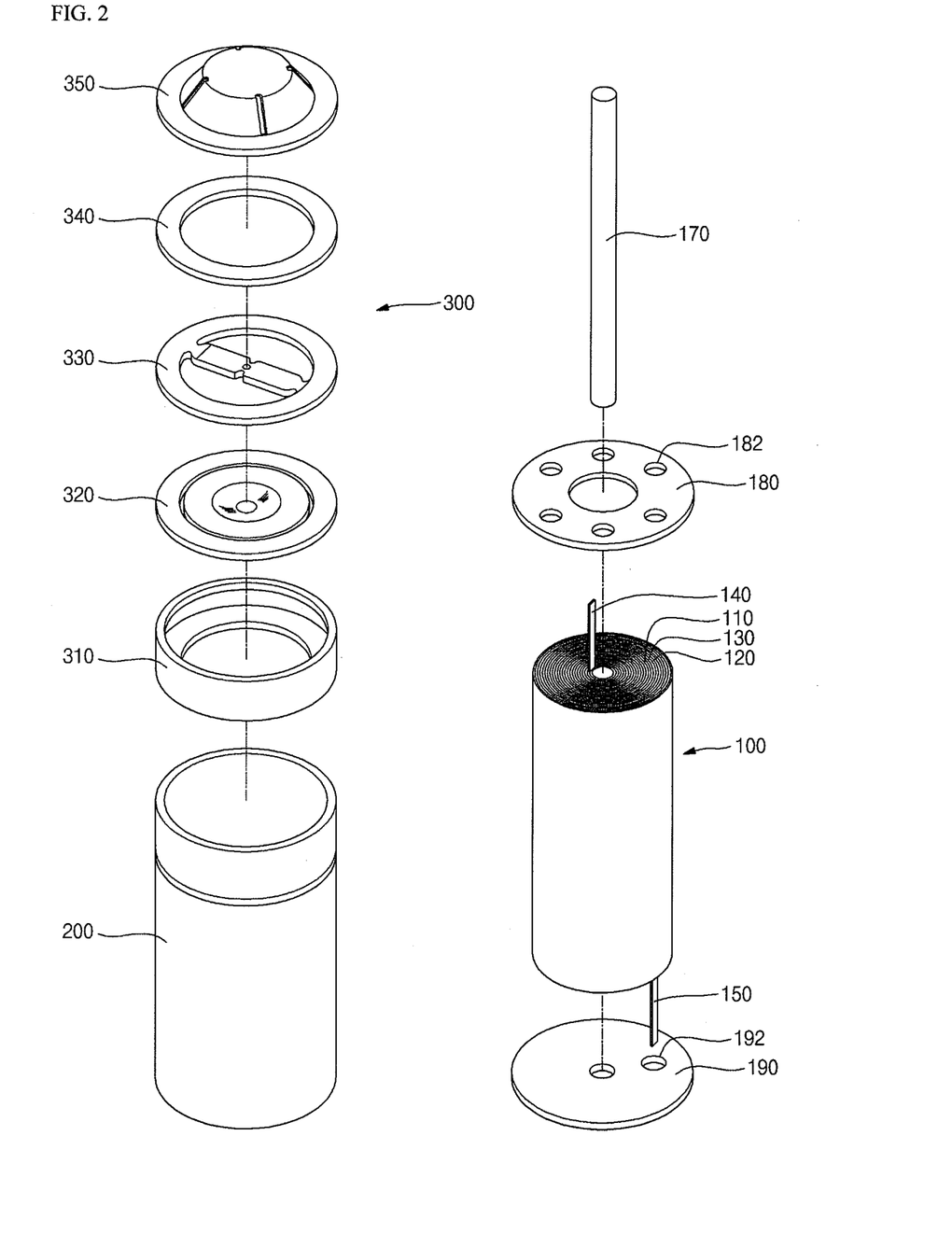
FIG. 2 is an exploded perspective view illustrating the secondary battery according to an embodiment.
Figure 3:
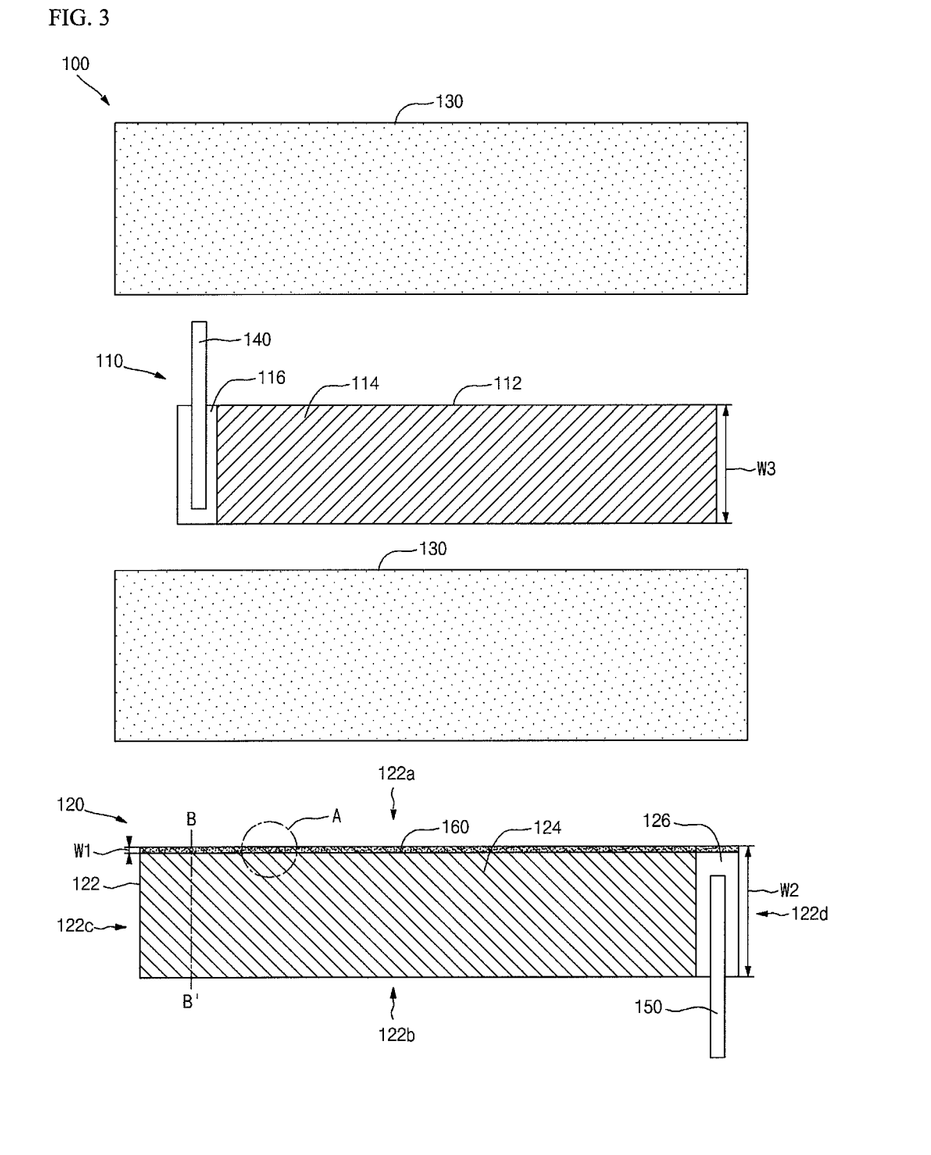
FIG. 3 is an exploded view illustrating an electrode assembly of the secondary battery according to an embodiment.
Figure 4:
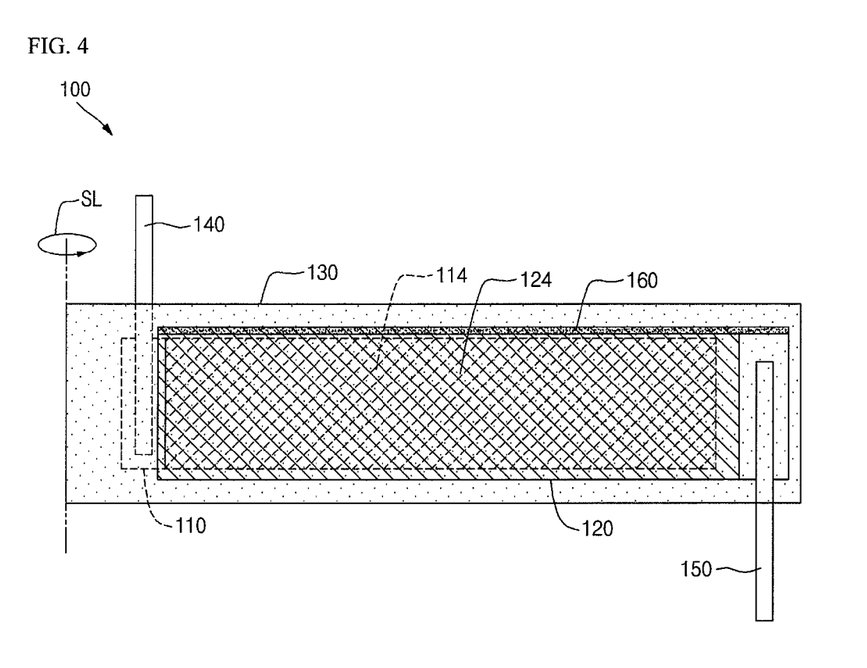
FIG. 4 is a view illustrating a state of the electrode assembly of the secondary battery before the electrode assembly is wound, according to an embodiment.
Figure 5:
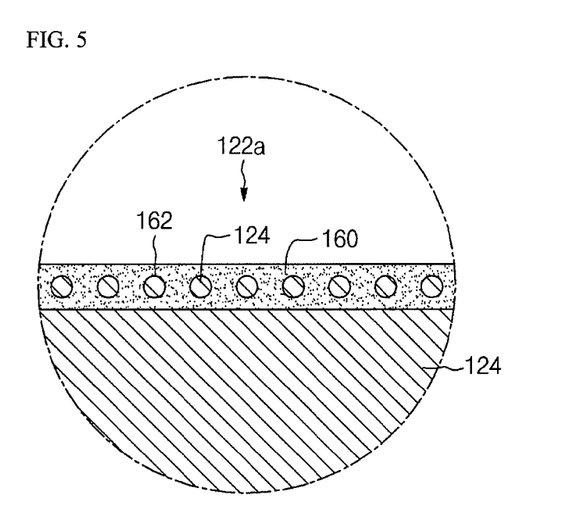
FIG. 5 is an enlarged view illustrating portion A of FIG. 3.
Figure 6A:
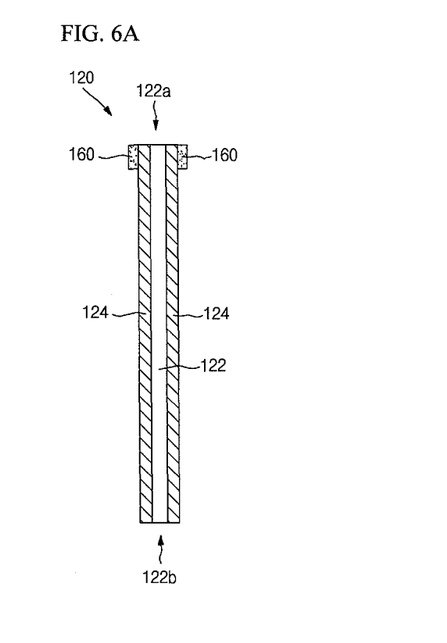
FIG. 6A and FIG. 6B are sectional views taken along line B-B' of FIG. 3.
Figure 6B:
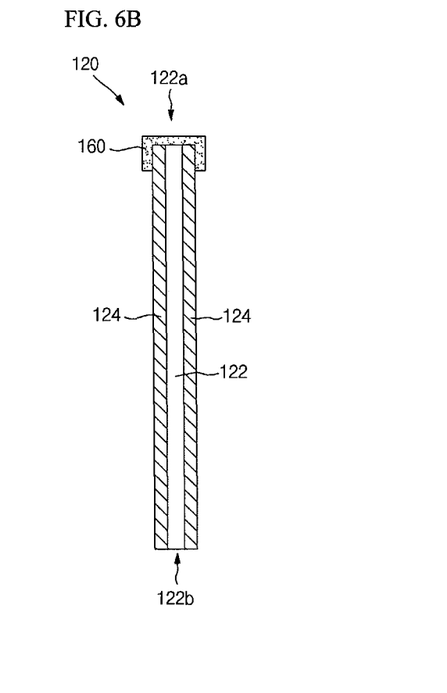
Figure 7A:
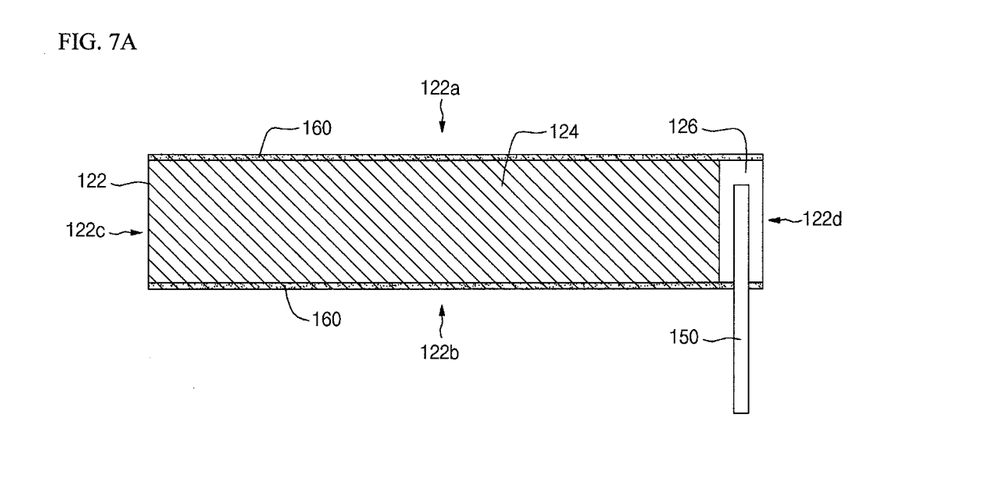
FIGS. 7A and 7B are views illustrating a second electrode of the electrode assembly of the secondary battery according to embodiments.
Figure 7B:
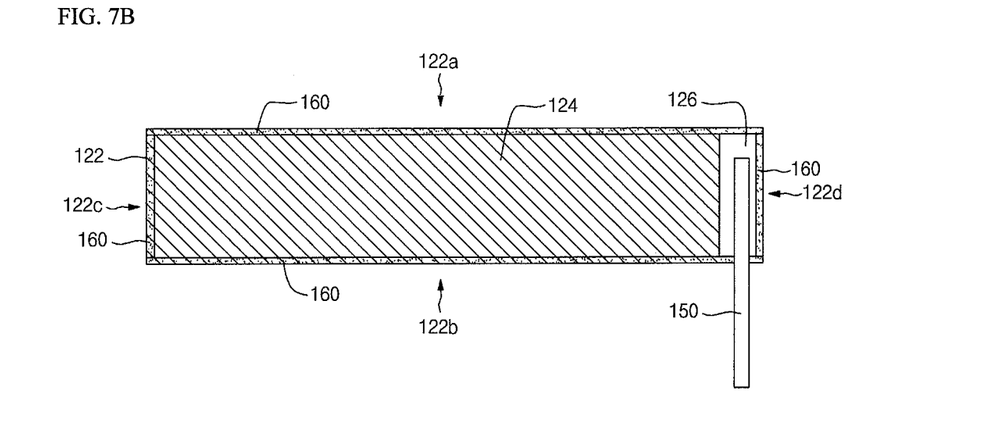

FIG. 1 is a perspective view illustrating a secondary battery according to an embodiment; FIG. 2 is an exploded perspective view illustrating the secondary battery according to an embodiment; FIG. 3 is an exploded view illustrating an electrode assembly of the secondary battery according to an embodiment; FIG. 4 is a view illustrating a state of the electrode assembly of the secondary battery before the electrode assembly is wound, according to an embodiment; FIG. 5 is an enlarged view illustrating portion A of FIG. 3; FIG. 6A and FIG. 6B are sectional views taken along line B-B' of FIG. 3; and FIGS. 7A and 7B are views illustrating a second electrode of the electrode assembly of the secondary battery according to embodiments.

Referring to FIGS. 1 to 7B, a secondary battery 1000 of the illustrated embodiment includes an electrode assembly 100, a case 200, and a cap assembly 300.

The electrode assembly 100 may include a first electrode 110, a second electrode 120, a separator 130, a first electrode tab 140, a second electrode tab 150, and a short circuit preventing film 160.

The electrode assembly 100 may be a roll type electrode assembly formed by winding the first electrode 110, the second electrode 120, and the separator 130 disposed between the first and second electrodes 110 and 120 as an insulator.

In the electrode assembly 100, the first electrode tab 140 may be electrically connected to the first electrode 110 and extend outward through the top side of the electrode assembly 100, and the second electrode tab 150 may be electrically connected to the second electrode 120 and extend outward through the bottom side of the electrode assembly 100. Herein, for the illustrative purpose, a side of the electrode assembly 100 facing the cap assembly 300 is defined as the top side of the electrode assembly 100, and a side of the electrode assembly 100 opposite to the top side is defined as the bottom side of the electrode assembly 100.

The first electrode 110 may be a positive electrode, and the second electrode 120 may be a negative electrode. On the other hand, the first electrode 110 may be a negative electrode, and the second electrode 120 may be a positive electrode. In the secondary battery 1000 of the illustrated embodiment, the first electrode 110 is a positive electrode, and the second electrode 120 is a negative electrode.

The first electrode 110 may include a first collector 112, a first coating portion 114 formed on a predetermined region of one or both sides of the first collector 112, and a first non-coating portion 116 where the first coating portion 114 is not formed to expose the first collector 112.

The first electrode tab 140 may be attached to the first non-coating portion 116 of the first electrode 110 and extend upward. In the illustrated embodiment, the first electrode tab 140 is attached to the first non-coating portion 116; however, in other embodiments, the first electrode tab 140 may be formed in one piece with the first collector 112 of the first electrode 110 and extend from an edge part of the first collector 112. In the latter case, the first non-coating portion 116 may not be formed, and the first coating portion 114 may be formed on the entire area of one or both sides of the first collector 112.

The second electrode 120 may include a second collector 122, a second coating portion 124 formed on a predetermined region of one or both sides of the second collector 122, and a second non-coating portion 126 where the second coating portion 124 is not formed to expose the second collector 122.

The second electrode tab 150 may be attached to the second non-coating portion 126 of the second electrode 120 and extend downward. In the illustrated embodiment, the second electrode tab 150 may be attached to the second non-coating portion 126; however, in other embodiments, the second electrode tab 150 may be formed in one piece with the second collector 122 of the second electrode 120 and extend from an edge part of the second collector 122. In the latter case, the second non-coating portion 126 may not be formed, and the second coating portion 124 may be formed on the entire area of one or both sides of the second collector 122.

The second coating portion 124 may include silicon (Si) or a silicon-containing compound. For example, the second coating portion 124 may include at least one selected from the group consisting of silicon, silicon oxides, and silicon-carbon complexes.

In the case where the first electrode 110 is a positive electrode and the second electrode 120 is a negative electrode, as shown in FIG. 4, the first electrode 110 may be smaller than the second electrode 120. In detail, the area of the first coating portion 114 of the first electrode 110 may be smaller than the area of the second electrode 120, and the first coating portion 114 of the first electrode 110 faces the second coating portion 124. For example, the entire area of the first coating portion 114 may be overlapped with the second coating portion 124.

When the electrode assembly 100 is charged, the first electrode 110 or the second electrode 120 expands. Particularly, if the second coating portion 124 of the second electrode 120 includes silicon or silicon-containing compound, the second electrode 120, that is, the second coating portion 124, may expand by 1.5 times after the electrode assembly 100 is charged. Thus, the second electrode 120 may make contact with another part (for example, the first electrode tab 140 or the first electrode 110) to cause a short circuit.

To prevent this, in the illustrated embodiment, the short circuit preventing film 160 may be disposed at a predetermined position of the second electrode 120.

The short circuit preventing film 160 may be disposed at one of first to fourth edges 122a, 122b, 122c, and 122d of the second electrode 120. For example, the short circuit preventing film 160 may be disposed on the first edge 122a of the second electrode 120 that is exposed to the top side of the electrode assembly 100. When the second electrode 120 expands, the first edge 122a of the second electrode 120 may be exposed, and thus the first edge 122a may be brought into contact with other parts of the electrode assembly to cause a short circuit. Particularly, since the first electrode tab 140 of the first electrode 110 extends upward, that is, the first electrode tab 140 is located in the expanding direction of the first edge 122a of the second electrode 120, the most likely short circuit to occur would be when the first edge 122a of the second electrode 120 contacts the first electrode tab 140 as the second electrode 120 expands.

The short circuit preventing film 160 may be disposed on a part of the second electrode 120. For example, the short circuit preventing film 160 may be disposed in a manner such that the short circuit preventing film 160 covers an edge of the second coating portion 124 formed on the surface of the second electrode 120. When it is said that the second electrode 120 expands, it is to be understood that the second coating portion 124, rather than the second collector 122, expands.

Therefore, the short circuit preventing film 160 can cover an edge of the second coating portion 124 to suppress expansion of the second coating portion 124 and to prevent the second coating portion 124 from contacting other parts of the electrode assembly, although the second coating portion 124 somewhat expands. The short circuit preventing film 160 may expand together with the second coating portion 124 to some degrees.

For this, the short circuit preventing film 160 may be formed of a flexible insulating material.

The short circuit preventing film 160 may include a base layer and an adhesive layer formed on one side of the base layer. The short circuit preventing film 160 may be attached to the second electrode 120 by attaching the adhesive layer to a surface of the second electrode 120. The base layer may be formed of a flexible insulating synthetic or natural resin such as polypropylene (PP).

The short circuit preventing film 160 may be formed by a solution coating method such as a dipping method.

Since the short circuit preventing film 160 can cover the second coating portion 124, if the short circuit preventing film 160 includes a plurality of holes 162 as shown in FIG. 5, more area of the second coating portion 124 can be exposed, and thus charging/discharging characteristics of the secondary battery 1000 can be improved.

The short circuit preventing film 160 may have a width suitable for covering the first edge 122a. For example, the short circuit preventing film 160 may have a width W1 smaller than ½ of the difference between the width W2 of the second electrode 120 and the width W3 of the first electrode 110. For instance, if the width W2 of the second electrode 120 is 50 mm and the width W3 of the first electrode 110 is 51 mm, the width W1 of the short circuit preventing film 160 may be 0.5 mm or smaller. In this case, after the electrode assembly 100 is formed by disposing the first and second electrodes 110 and 120 to face each other as shown in FIG. 4, and winding the mutually facing first and second electrodes 110 and 120, the area of the second coating portion 124 of the second electrode 120 can be greater than the area of the first coating portion 114 of the first electrode 110. It is unnecessary to set a lower limit (minimum) of the width W1 of the short circuit preventing film 160. However, the minimum of the width W1 of the short circuit preventing film 160 may be determined according to the manufacturing conditions. The thickness of the short circuit preventing film 160 may be selected from the range of several microns (μm) to several hundreds of microns (μm) according to the capacity and size of the secondary battery 1000.

As shown in FIG. 6A, the short circuit preventing film 160 may cover both sides of the first edge 122a of the second electrode 120, or as shown in FIG. 6B, the short circuit preventing film 160 may cover both sides and the top of the first edge 122a of the second electrode 120.

As shown in FIG. 7A, the short circuit preventing film 160 may be disposed on the first edge 122a and the second edge 122b located at the bottom side of the electrode assembly 100. When the electrode assembly 100 expands, the short circuit preventing film 160 disposed on the second edge 122b can prevent a short circuit between parts of the electrode assembly, particularly, between the first and second electrodes 110 and second electrode 120.

As shown in FIG. 7B, the short circuit preventing film 160 may also be disposed on the leading edge and the trailing edge of the second electrode 120, that is, on the third edge 122c and on the fourth edge 122d of the second electrode 120. The second electrode 120 can be wound by first winding the leading edge, and then winding the trailing edge.

As shown in FIGS. 3 and 4, the electrode assembly 100 may be assembled by piling two separators 130, the first electrode 110, and the second electrode 120 in the order of the separator 130, the first electrode 110, the separator 130, and the second electrode 120, and winding the two separators 130, the first electrode 110, and the second electrode 120 about a winding center axis SL.

A center pin 170 may be inserted in the electrode assembly 100 along the center line of the electrode assembly 100. For example, the two separators 130, the first electrode 110, and the second electrode 120 may be wound by using the center pin 170 as the winding center axis SL.

The electrode assembly 100 may be disposed inside the case 200.

The case 200 may have a cylindrical can shape with an opened side. The case 200 may include an accommodation part for receiving the electrode assembly 100. The case 200 may be formed of a conductive material such as aluminum (Al), iron (Fe), or an alloy thereof.

When the electrode assembly 100 is inserted into the case 200, top and bottom insulating plates 180 and 190 may be placed at the top and bottom sides of the electrode assembly 100. The bottom insulating plates 180 and 190 may prevent an unintended contact between the electrode assembly 100 and other parts of the electrode assembly, that is, the bottom insulating plates 180 and 190 may prevent a short circuit. The top insulating plate 180 may include penetration holes 182 for allowing penetration of the first electrode tab 140, and the bottom insulating plate 190 may include penetration holes 192 for allowing penetration of the second electrode tab 150.

The cap assembly 300 can cover the opened side of the case 200 after the electrode assembly 100 is inserted into the case 200.

The cap assembly 300 may include an insulating gasket 310, a safe vent 320, a circuit substrate 330, a positive temperature coefficient (PTC) thermistor 340, and an upper cap 350.

The insulating gasket 310 may be used as a sealing member between the case 200 and other parts of the cap assembly 300 such as the safe vent 320, the circuit substrate 330, the PCT thermistor 340, and the upper cap 350.

That is, the insulating gasket 310 may be brought into contact with sides of the safe vent 320, the circuit substrate 330, the PCT thermistor 340, and the upper cap 350, and may be coupled to the case 200, so as to seal the inside of the case 200.

The safe vent 320 may be disposed at a lower edge part of the cap assembly 300, that is, at a position facing the top insulating plate 180. If the inside pressure of the secondary battery 1000 increases to a predetermined value, the safe vent 320 can swell. To address this, initially, a part of the safe vent 320 may be bent downward.

The circuit substrate 330 may be disposed at the top side of the safe vent 320 and may be electrically and mechanically connected to the safe vent 320. The circuit substrate 330 can disconnect a circuit if the safe vent 320 swells.

The PCT thermistor 340 may be disposed at the top side of the circuit substrate 330 and may be electrically and mechanically connected to the circuit substrate 330. The resistance of the PCT thermistor 340 can increase steeply if the temperature of the PCT thermistor 340 increases higher than a predetermined value.

The upper cap 350 may be disposed at the top side of the PCT thermistor 340 and may be electrically and mechanically connected to the PCT thermistor 340.

The first electrode tab 140 extending from the first electrode 110 of the electrode assembly 100 may be electrically connected to the safe vent 320, and the second electrode tab 150 extending from the second electrode 120 may be electrically connected to the case 200. Therefore, the upper cap 350 of the cap assembly 300 can function as a first terminal of the secondary battery 1000 having the same polarity as that of the first electrode 110, and the case 200 can function as a second terminal of the secondary battery 1000 having the same polarity as that of the second electrode 120.

Figure 8:
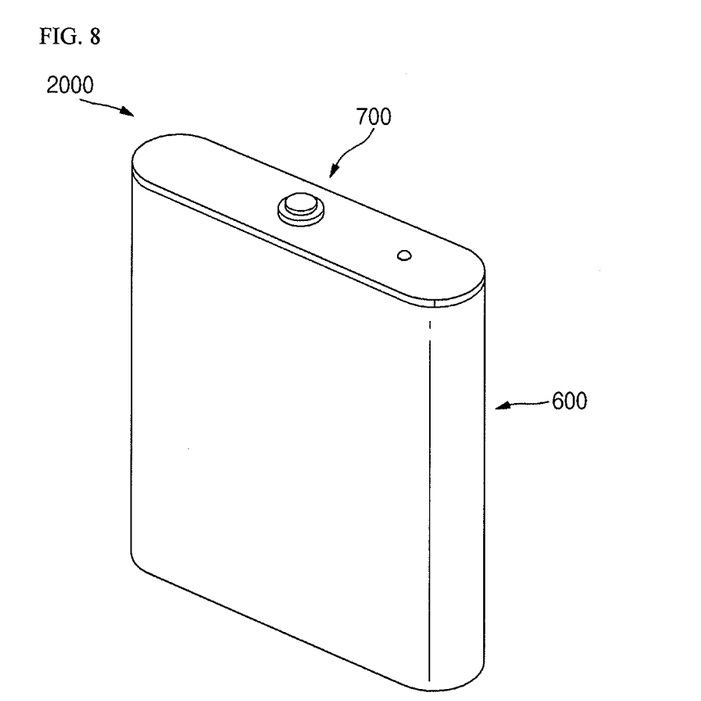
FIG. 8 is a perspective view illustrating a secondary battery according to another embodiment.
Figure 9:
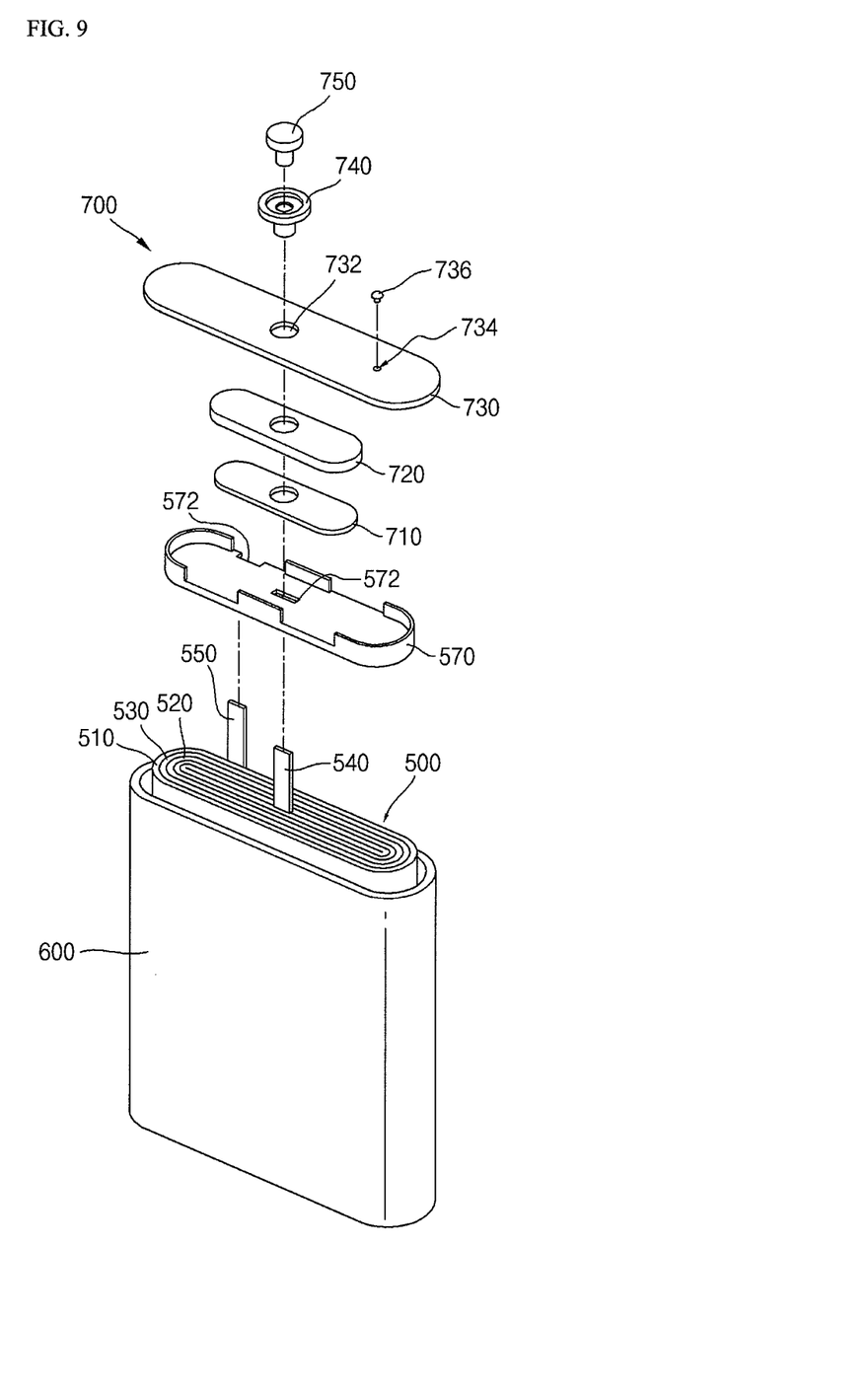
FIG. 9 is an exploded perspective view illustrating the secondary battery according to an embodiment.
Figure 10:
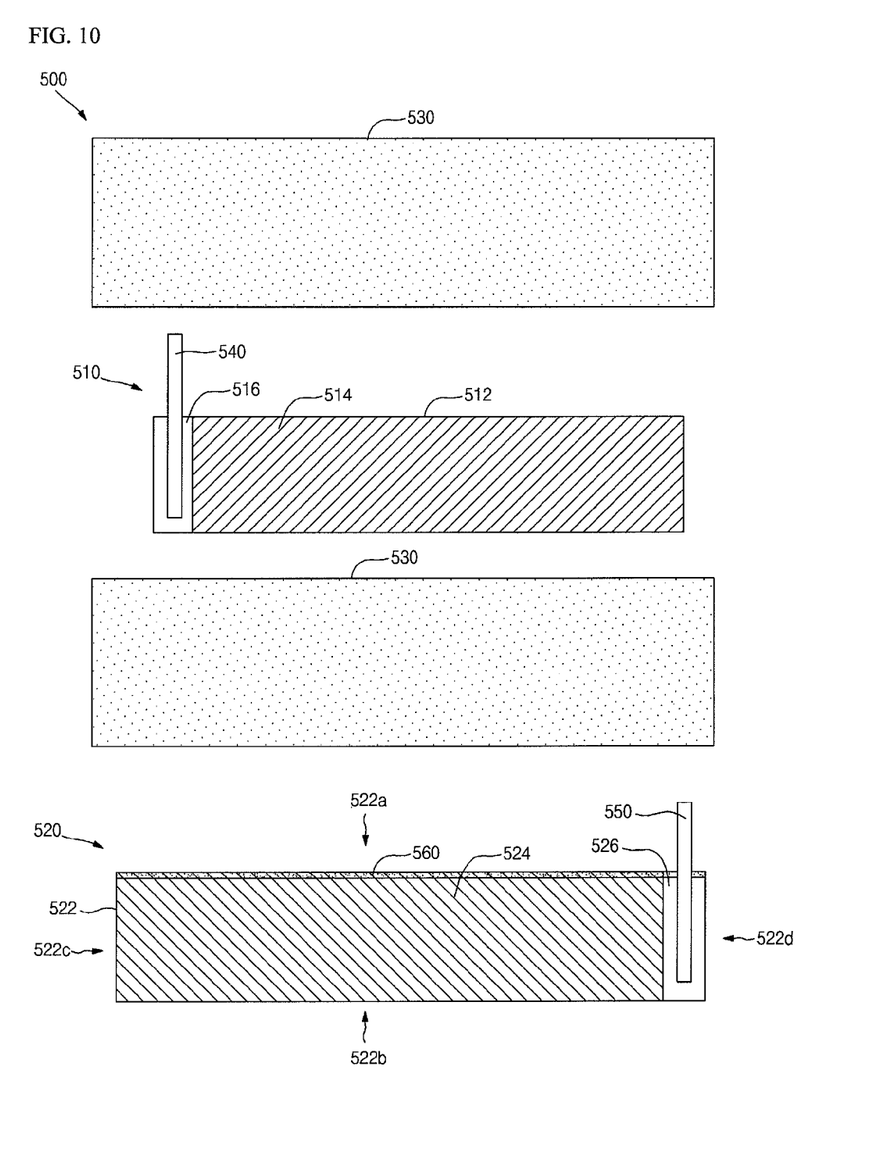
FIG. 10 is an exploded view illustrating an electrode assembly of the secondary battery according to an embodiment.
Figure 11:
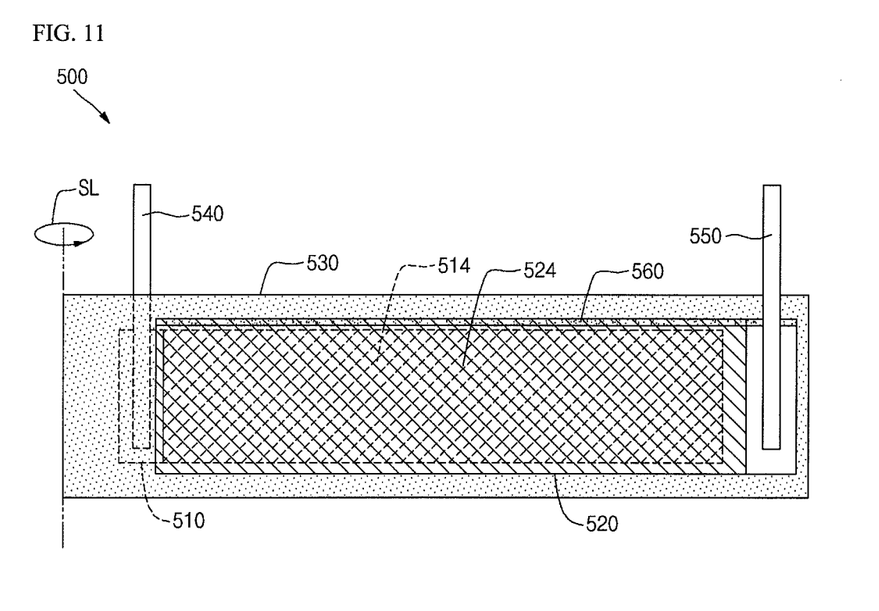
FIG. 11 is a view illustrating a state of the electrode assembly of the secondary battery before the electrode assembly is wound, according to an embodiment.

FIG. 8 is a perspective view illustrating a secondary battery according to another embodiment; FIG. 9 is an exploded perspective view illustrating the secondary battery according to an embodiment; FIG. 10 is an exploded view illustrating an electrode assembly of the secondary battery according to an embodiment; and FIG. 11 is a view illustrating a state of the electrode assembly of the secondary battery before the electrode assembly is wound, according to an embodiment.

Referring to FIGS. 8 to 11, a secondary battery 2000 of the current embodiment includes an electrode assembly 500, a case 600, and a cap assembly 700.

The electrode assembly 500 includes a first electrode 510, a second electrode 520, a separator 530, a first electrode tab 540, a second electrode tab 550, and a short circuit preventing film 560.

The first electrode 510 may include a first collector 512, a first coating portion 514, and a first non-coating portion 516, and the second electrode 520 may include a second collector 522, a second coating portion 524, and a second non-coating portion 526.

The electrode assembly 500 may have a structure similar to the structure of the electrode assembly 100 illustrated in FIGS. 1 to 7B. However, as shown in FIGS. 8 to 11, the first electrode tab 540 and the second electrode tab 550 may extend in the same direction, that is, upward, and the side of the electrode assembly 500 may be pressed after the electrode assembly 500 is wound.

Like the short circuit preventing film 160 illustrated in FIGS. 1 to 7B, the short circuit preventing film 560 may be disposed on at least one of first to fourth edges 522a, 522b, 522c, and 522c, so as to prevent a short circuit when the second electrode 520 expands, particularly when the second coating portion 524 expands.

An insulating case 570 may be disposed at the top side of the electrode assembly 500.

The insulating case 570 may be an insulator disposed between the electrode assembly 500 and the cap assembly 700. The insulating case 570 may include penetration holes 572 through which the first electrode tab 540 and the second electrode tab 550 are respectively inserted.

The case 600 may have a prismatic can shape with an opened side, and an accommodation part may be formed in the case 600 to receive the electrode assembly 500.

The electrode assembly 500 may be placed in the accommodation part of the case 600, and then the insulating case 570 may be placed in the case 600 at the top side of the electrode assembly 500.

After the electrode assembly 500 and the insulating case 570 are placed in the case 600, the cap assembly 700 may be coupled to the opened side of the case 600 to seal the opened side.

The cap assembly 700 may include a terminal plate 710, an insulating plate 720, a cap plate 730, an insulating gasket 740, and an electrode terminal 750.

The terminal plate 710 may be electrically connected to the first electrode tab 540 extending from the first electrode 510 of the electrode assembly 500. Since the terminal plate 710 may be electrically connected to the first electrode 510, the terminal plate 710 may function as a first electrode terminal of the secondary battery 2000 of the current embodiment.

The terminal plate 710 may include a first penetration hole 712 so as to be electrically and mechanically coupled to the electrode terminal 750.

The insulating plate 720 may be disposed at the top side of the terminal plate 710 as an insulator between the terminal plate 710 and the cap plate 730.

The insulating plate 720 may include a second penetration hole 722 through which the electrode terminal 750 is inserted.

The cap plate 730 may be electrically connected to the second electrode tab 550 of the electrode assembly 500, and the planar shape of the cap plate 730 may be substantially the same as that of the opened side of the case 600 so that the case 600 can be sealed by the cap assembly 700. That is, in the current embodiment, the cap plate 730 can function as a seal member for sealing the case 600 of the secondary battery 2000, and since the cap plate 730 may be electrically connected to the second electrode 520, the cap plate 730 can also function as a second electrode terminal of the secondary battery 2000.

The cap plate 730 may include a third penetration hole 732 through which the electrode terminal 750 is inserted, and an electrolyte injection hole 734 for injecting electrolyte.

The electrolyte injection hole 734 can be closed using an injection hole cap 736.

The electrode terminal 750 may be electrically connected to the terminal plate 710 through the third penetration hole 732 of the cap plate 730, the second penetration hole 722 of the insulating plate 720, and the first penetration hole 712 of the terminal plate 710, and the electrode terminal 750 may function as a fastener to couple the insulating plate 720 and the terminal plate 710 to the cap plate 730. The insulating gasket 740 may be disposed between the electrode terminal 750 and the cap plate 730 as an insulator.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly comprising:
   a first electrode having a first width wherein the first electrode comprises a first coating portion;
   a second electrode having a second width wherein the second electrode comprises a second coating portion and wherein the second coating portion comprises a silicon or silicon containing compound and wherein the second width is wider than the first width;
   a separator disposed between the first electrode and the second electrode;
   a film disposed on at least one edge of the second electrode; and
   a first electrode tab disposed on one edge of the first electrode, wherein the one edge of the first electrode is positioned in the same direction as the film formed on the one edge of the second electrode.

2. The electrode assembly of claim 1, wherein the film is configured to prevent short circuit from contact of the second electrode with the first electrode tab.

3. The electrode assembly of claim 1, wherein the film comprises an insulating material.

4. The electrode assembly of claim 1, wherein the film comprises an adhesive layer and a base layer, wherein the base layer is adhered to the at least one of the first and second electrodes by the adhesive layer.

5. The electrode assembly of claim 1, wherein the film comprises a width that is less than the difference in widths of the first electrode and the second electrode.

6. The electrode assembly of claim 1, wherein the film comprises a width that is less than half of the difference in widths of the first electrode and the second electrode.

7. The electrode assembly of claim 1, wherein the film is disposed on a first surface of the at least one of the first and second electrodes.

8. The electrode assembly of claim 7, wherein the film is further disposed on a second surface of the at least one of the first and second electrodes opposite to the first surface.

9. The electrode assembly of claim 8, wherein the film is disposed between the first and second surfaces of the electrode and over a top surface of the electrode.

10. The electrode assembly of claim 1, wherein the film is disposed on an upper edge of the at least one of the first and second electrodes.

11. The electrode assembly of claim 10, wherein the film is further disposed on a lower edge of the at least one of the first and second electrodes.

12. The electrode assembly of claim 11, wherein the film is further disposed on at least one edge connecting the upper edge and the lower edge of the at least one of the first and second electrodes.

13. The electrode assembly of claim 12, wherein the film is disposed on every edge of the at least one of the first and second electrodes.

14. The electrode assembly of claim 1, wherein the at least one of the first and second electrodes comprises a coating portion that comprises silicon or a silicon-containing compound.

15. The electrode assembly of claim 1, wherein the film is disposed on one edge of the at least one of the first and second electrodes and an electrode tab extends from a parallel edge of the other electrode of the first and second electrodes.

16. A secondary battery comprising the electrode assembly of claim 1.

17. An electrode assembly comprising:
- a first electrode having a first width wherein the first electrode comprises a first coating portion;
- a second electrode having a second width wherein the second electrode comprises a second coating portion and wherein the second coating portion comprises a silicon or silicon containing compound and wherein the second width is wider than the first width;
- a separator interposed between the first and second electrodes;
- an insulator formed on at least one edge of one of the first and second electrodes; and, having a wider width of the first and second widths and having silicon or a silicon containing compound and
- a first electrode tab disposed on one edge of the first electrode, wherein the one ewe of the first electrode is positioned in the same direction as the insulator formed on the one edge of the second electrode,
- wherein the insulator is configured to prevent short circuit from contact of the second electrode with the first electrode tab.

18. The electrode assembly of claim 1, wherein the film comprises openings in a portion of the film covering the coating portions to expose surface area of the coating portions.

* * * * *